United States Patent

Magnino, Jr. et al.

[15] 3,645,745

[45] Feb. 29, 1972

[54] METHOD OF PRODUCING A SOLUBLE PROTEIN PRODUCT

[72] Inventors: Pete J. Magnino, Jr.; Christopher W. Frederiksen, both of St. Louis, Mo.

[73] Assignee: Ralston Purina Company, St. Louis, Mo.

[22] Filed: July 8, 1968

[21] Appl. No.: 743,034

[52] U.S. Cl. ..............................................99/17, 260/123.5
[51] Int. Cl. ..........................................................A23j 1/14
[58] Field of Search .......................99/17, 14, 98; 260/123.5

[56] References Cited

UNITED STATES PATENTS 2,304,099   12/1942   Julian et al. ..........................260/123.5
3,303,182   2/1967    Sakai et al. ................................99/17

OTHER PUBLICATIONS

Ziemba, John V., " Let Soy Proteins Work Wonders for You."

Food Engineering May 1, 1966, Vol. 38 No. 5, pp. 82– 84, 87– 90, and 93.

Primary Examiner—A. Louis Monacell
Assistant Examiner—William A. Simons
Attorney—R. W. Brukardt and D. T. Nikaido

[57] ABSTRACT

Producing a soluble protein product from oleaginous seed materials which involves altering the physical structure of the protein molecules by subjecting to a solution having a pH range from 1 to 2 or from 10 to 12 and heating said liquid portion to 85° to 350° F., later precipitating the protein and, subjecting an aqueous suspension of this precipitated protein to instantaneous heat and pressure, then passing through a zone of lower pressure and converting the protein to a dry, particulate protein product. This soluble protein may be used to produce protein-enriched food products and is particularly desirable for use in clear or transparent food products or foods where high solubility is desired, since said protein is very soluble and, therefore, does not distract from the physical properties of a clear food product.

21 Claims, No Drawings

METHOD OF PRODUCING A SOLUBLE PROTEIN PRODUCT

BACKGROUND OF THE INVENTION

The art is familiar with currently available high protein products which are employed in producing protein-enriched food products. Such products are desirable in the sense that they provide a readily available source of protein, however, the same product is not desirable when employed in food products which require good solubility properties. For example, if the currently available protein products were to be employed in clear food products such as beverages, gelatins and the like, the resulting product would contain a fine suspension of the protein material and thereby would produce a resulting product which was not clear and would, therefore, detract from the physical properties of such a product. Therefore, it would appear to be highly desirable to provide a concentrated source of edible protein which would be readily soluble in specified mediums to produce protein enriched food products which are also physically attractive, e.g., clear protein enriched beverages, gelatins and the like.

SUMMARY OF THE INVENTION

A method for producing a protein product which comprises the steps of forming an aqueous slurry containing defatted oleaginous seed materials, the liquid portion of said slurry containing dissolved carbohydrate and protein materials; separating the liquid portion from the solid portion; adjusting the pH of the liquid portion and heating said liquid portion to elevated temperatures, said pH adjustment and heating producing substantial alterations in the physical properties of the protein molecules; adjusting the liquid portion to a pH sufficient to precipitate the dissolved protein material; separating the precipitated protein material from the liquid portion thereof: adjusting said precipitated protein to about a neutral or strongly acid pH; subjecting said protein to instantaneous heat and pressure and converting said protein to a resulting, dry, particulate protein product.

DESCRIPTION OF THE PREFERRED EMBODIMENTS

The oleaginous seed materials employed in the present invention include soybeans, cottonseed, sesame, sunflower, safflower, peanuts, and the like and are prepared for use in the invention by known methods. For example, soybeans are contacted with an organic solvent, e.g., hexane, to extract the oil therefrom. The resulting solid product is commonly called soybean meal or flakes. Such meal or flakes or, alternately, finely ground flour made therefrom may be used as the starting material to produce the particular product of the invention. The solvent extracted soybean material is referred to as defatted soybean flakes, meal or flour and such terminology will be used to describe the extracted material. The term "-soluble protein" as used herein means a protein that will form a colloidal dispersion in a dispersing medium to form a resulting clear or relatively clear liquid mixture.

The present invention is best accomplished by forming a slurry with defatted soybean flakes and water. The slurry is agitated for a sufficient time to extract the soluble protein and carbohydrate materials contained within the physical, cellular structure of the original flakes. The slurry consists of the suspended solid, cellular seed material with a major portion of the protein and carbohydrate materials in solution. If desired, the slurry may be adjusted to an alkaline pH to increase the speed of removal of the soluble materials. The aqueous slurry may be formed at a pH of from about 6 to about 11 and preferably from about 6.8 to about 10.5. As an alternative procedure, the protein and carbohydrate materials may be dissolved out of the flakes by placing the flakes into an acid solution having a pH of from about 1.2 to about 2.5. The liquid portion is separated from the solid cellular material as completely as is possible.

The liquid portion is adjusted to an alkaline pH range of about 10 to about 12, and preferably from about 11 to about 11.8 or to an acid pH in the range of from about 1 to about 2. The liquid is then heated to a temperature of from about 85° to about 350° F. for a time period of from about 24 hours to about 5 seconds. It is preferred that the liquid be heated to a temperature of from about 140° to about 180° F. for a time period of from about 20 minutes to about 120 minutes. The pH is adjusted to the above-described alkaline range with suitable chemicals such as sodium hydroxide, calcium hydroxide, ammonium hydroxide and the like; however, sodium hydroxide is preferred. It has been found that the best results are obtained when the chemical is present in liquid portion in an amount from about 6 percent to about 11 percent by weight based on the estimated dry weight of the protein present in the liquid. The acid range may be obtained by the addition of suitable acids such as phosphoric, hydrochloric, sulfuric, sulfurous and the like. The above-described treatment of the liquid causes physical alterations within the protein molecules which plays an important part in providing the product of the invention with the desirable solubility properties. Such physical alterations will hereinafter be referred to as "hydrolysis." It is essential that the above ranges of time and temperature be observed since insufficient hydrolysis will not provide the necessary solubility properties of the invention. On the other hand, if excessive hydrolysis takes place, the protein will be reduced to short chain peptides or its amino acids and some of the amino acids destroyed. Amino acid destruction would drastically reduce the nutritional value of the protein as well as being detrimental to the functional properties of the product. It is understood that, where desired, the protein may be precipitated from the solution immediately after it is extracted and separated from the solid flake material and prior to the subsequent pH adjustment in the range as described above, i.e., from about 1 to about 2 or 10 to about 12. The protein may then be dissolved in the pH range set forth above, reprecipitated and processed in accordance with the procedure set forth herein.

The pH-adjusted, heated, liquid as described above is subsequently adjusted with an appropriate edible acid to the isoelectric point of the protein at which point the protein is precipitated out of solution. Acids that may be employed in such precipitation include suitable food acids such as phosphoric, hydrochloric, sulfuric, sulfurous and the like. The precipitation is carried out at a pH of from about 4 to about 5 and preferably at about 4.5. The soluble extracted carbohydrates remain in solution.

The solid precipitated protein material is separated from the liquid as completely as practicable and is washed sufficiently to remove substantially all of the soluble carbohydrates that may remain in the protein material. The protein material is then suspended in water to obtain an appropriate solids content and the slurry is adjusted to a pH of from about 5 to about 7.5 and preferably about 6.8 to obtain a dispersible product. If an acid product is desired, the pH is adjusted to a range of from about 2.0 to about 4 and preferably about 3. The slurry in either of the pH ranges may be subjected to pressure and dynamic instantaneous heating at an elevated temperature range while also being dynamically and physically worked, preferably almost simultaneously. Currently, the most satisfactory way of achieving this is to pass the slurry through a device commonly known as a Jet Cooker. For example, it includes adjacent jet nozzle orifices, normally concentric, through which the slurry and the pressurized steam used as a heating agent are ejected at high velocities in intersecting flow patterns, so that each tiny bit of slurry is instantly and dynamically heated by the steam while simultaneously being subjected to severe physical forces at the nozzle, such physical working being largely of a shearing nature and to expose new surface areas of the protein to promote both the volatilization of the undesirable flavor components and also provide for the desirable physical alteration of the protein molecules. The physical working of each tiny portion is believed to expose the undesirable flavor components associated therein to physical action, and this physical action of working together with the elevated temperature heat treatment is believed to weaken and/or loosen the tenacious attraction between the undesirable components and the complex protein molecules, to an extent where the undesirable flavor components can be removed with the flashed off vapors in a subsequent vacuum chamber treatment. It is preferred that the Jet Cooking be combined with a subsequent vacuum chamber treatment to obtain the desirable properties of the product of the invention. This physical working and heating results in substantially eliminating the characteristic soy flavor where soybeans are employed, but more importantly, assists in physically altering the protein molecule to obtain the desirable solubility and viscosity properties of the product. Such treatment also prepares the material for subsequent processing steps. The temperature range to which the protein slurry is heated and Jet Cooked for the desired results is about 220°–400° F., although the temperature should not be in the lower region of this range unless the product is subsequently vented into a high-vacuum chamber after being held under pressure in a special holding chamber. Normally, the temperature should be about 285°–320° F., for best results. The slurry is held at such temperatures for a period of from about 5 to about 30 seconds. The heated slurry is then immediately released to atmospheric pressure or to a vacuum chamber to "flash off" the volatile, undesirable flavor components and subsequently the evaporatively cooled material is dried and reduced to the desired particle size. Drying may be accomplished by conventional means such as roller drying, vacuum drying, freeze drying, spray drying and the like. It is important to note that the above-described treatment produces a product which is nearly sterile, and therefore, highly desirable for use in producing food products. It is to be understood that, where desirable, the precipitated protein material may be subjected to more than one Jet Cooking treatment in order to improve the desirable properties of the product of the invention.

In an alternate method, a soluble protein is extracted from defatted oleaginous seed materials such as soybeans in the manner as previously described. The solids and liquid are separated and the liquid is adjusted to a pH of from about 10 to about 12 The liquid is directly passed to a Jet Cooker where it is instantaneously heated to elevated temperatures in the range of from about 220° to about 350° F., passed to a vacuum chamber and the pH adjusted to the isoelectric point of the protein to precipitate said protein. The precipitate and liquid are separated and the precipitate is adjusted to a neutral or acid pH. The precipitate is again subjected to Jet Cooking and the vacuum chamber and subsequently converted to a resulting dry, particulate protein product.

The particular combination of the steps of adjusting the protein containing solution to a pH of about 10 to about 12 or 1 to about 2 and subsequently precipitating, dispersing and Jet Cooking the resulting dispersed precipitated protein product produces the desirable properties of the product of the invention. Not only is the solubility of the protein product substantially improved over the product that are currently available, but, in addition, the viscosity of a liquid mixture containing the protein product is substantially reduced. Such a reduction in viscosity is advantageous where it is desirable to dissolve the protein product in liquid form into another liquid product. The low viscosity of such a mixture not only makes it easier to dissolve a given quantity of the protein mixture into a liquid medium, but also provides the additional advantage of maintaining a low viscosity where the resulting product into which it is incorporated is stored at refrigerated temperatures.

The defatted oleaginous seed materials that may be employed in the invention include soybeans, cottonseed, peanuts, safflower, sunflower, and the like; however, soybean flakes or meal and soybean flour are preferred. The protein contained in such seed materials must be present in a soluble form. It is preferred that the flake-type materials be used in the method of the invention since flour is more difficult to wet and tends to initially form lumps when contacted with the aqueous solution.

It has been found that it is desirable to form the initial slurry at elevated temperatures in the range of from about 80° to about 100° F. Such temperatures may be achieved in various ways including adding flakes to water having the desired temperature or forming a slurry and, thereafter, raising the temperature to the desired level.

The extraction of the soluble proteins and carbohydrates from the flake is best accomplished in the slurry by having the water and flakes present in a ratio in the range from about 2:1 to about 100:1 by weight and preferably from about 8:1 to about 20:1 (water:flakes). The preferred ranges of the ratio of water to flakes provides a highly efficient and economical means of extraction. Where desired, the slurry may be adjusted to an alkaline pH to increase yield and decrease the time required for extraction of the soluble materials. Where desired, the extracted protein may be precipitated, separated, redissolved and reprecipitated, under the conditions as described above, to effect a more complete separation of the carbohydrates from the precipitated protein material. Chemicals suitable for adjusting the pH to the desired level include sodium hydroxide, calcium hydroxide, ammonium hydroxide and the like.

After separating the solid materials from the protein containing liquid, the latter is adjusted to the isoelectric point of the protein to uniformly precipitate the dissolved protein out of solution. The desired pH is obtained by utilizing suitable food acids such as phosphoric, hydrochloric, sulfuric, sulfurous and the like.

After the protein has been precipitated and the solid and liquid portions have been separated, the solid material is washed to remove additional soluble carbohydrates which may be present. It is then preferably dispersed in water to a total solids content of from about 12 to about 20 percent by weight before being neutralized or acidified. The described range of dispersed solids has been found to be convenient for drying as by spray drying.

Subsequent to adjusting the dispersed protein to a desired solids range and pH range and prior to drying, the dispersed protein mixture may be subjected to a flash heat treatment to obtain the desirable properties of the invention. Such heat treatment if preferably accomplished by subjecting the mixture to live steam in a Jet Cooker under pressure for a period of 5 to 30 seconds. The heated mixture is immediately fed to a zone of lower pressure, e.g., atmospheric pressure, vacuum chamber, etc., to simultaneously volatilize any excess moisture and undesirable flavor components and subsequently fed to a drier such as a spray drier to produce the final product. Satisfactory results may also be obtained by heating under pressure the mixture containing an appropriate solids content in a suitable heat exchanging means and immediately passing the heated mixture to a zone of lower pressure, e.g., vacuum chamber, prior to drying the resulting product.

The product of the invention have been described as having either acid or neutral properties. The acid products are soluble in acid mediums such as in soft drinks, citric juices and other foods having an acid pH. The neutral products are soluble in neutral or slightly alkaline mediums such as in coffee whiteners, imitation milk, imitation ice cream, whipped toppings and the like. Both the aid and neutral product provide the outstanding property of being soluble in a clear medium under suitable pH conditions and, once dissolved, to retain the clear property of the mediums as opposed to becoming cloudy or murky. More importantly, the product of the invention provides a soluble source of protein for producing protein enriched food products.

The product produced by the process, as previously set forth, has excellent solubility and viscosity properties in addition to good flavor and very low micro-organism load not heretofore obtainable by methods known to the art. Such products may be used in various ways such as in the production of food ingredients and food products.

The following examples are illustrative of the invention and are not intended to limit the scope thereof.

EXAMPLES

Example 1

I. Defatted soybean flakes were slurried in water at a temperature of 85° F. with a water to flake ratio of 9:1. To the slurry was added 1.6 percent of calcium hydroxide and 1.0 percent of sodium sulfite, said percentages being based on the total weight of the flakes. The slurry was agitated for a period of 30 minutes and subsequently the liquid was separated from the solid materials in a centrifuge. The solid materials were reslurried in water at a ratio of 6 parts per water to 1 part of flakes and this slurry was agitated for a period of 10 minutes, after which time the solid and liquid materials were separated, as before, in a centrifuge. The two liquid portions or extracts were combined.

To the combined liquid portions, which contains soluble proteins and carbohydrates, was added 7.5 percent sodium hydroxide, said percentage being based on the estimated dry weight of protein present. The liquid portion has a pH of about 11.5 after the addition of sodium hydroxide. The liquid was then heated to 160° F. and that temperature maintained for a period of 40 minutes. After heating, phosphoric acid was added to the liquid to adjust the pH from about 11.5 to the isoelectric point of the protein, i.e., pH of about 4.5. The dissolved protein was precipitated out of solution and the precipitated curd was concentrated and washed in a centrifuge to remove the carbohydrate materials as completely as possible. The washed protein curd was diluted in a ratio of 1:1 by weight with fresh water and concentrated to about 17 percent by weight solids.

II. NEUTRAL, SOLUBLE PROTEIN PRODUCT

The concentrated curd of I above was diluted to about 15 percent by weight solids and the pH adjusted to about 6.8 with sodium hydroxide. The neutralized protein curd was then passed to a Jet Cooker where the temperature of the curd was raised instantaneously to a temperature of 310° F. and held at that temperature for a period of about 5 seconds. The curd was then injected into a vacuum chamber under 27 inches of mercury vacuum. The heated curd was passed from the vacuum chamber to a spray drier under a pressure of 4,000 p.s.i. and dried at an exhaust temperature of 180° F. The resulting product was a finely divided particulate neutral protein product.

Several tests were conducted to compare the properties of the product of the invention with other similar products which have been produced by different methods. The products compared are listed as A, B, C and D. Products C and D are made in accordance with the process of the invention.
- A. isolated soy protein which has not been hydrolyzed but has been Jet Cooked and currently available on the market.
- B. isolated soy protein which has been hydrolyzed but not Jet Cooked.
- C. product of Example 1 — isolated soy protein which has been hydrolyzed and Jet Cooked.
- D. product of C above which has been Jet Cooked a second time before spray drying.

The following tests were conducted to obtain the results as set forth in Table I.

Solubility Index

Disperse 4 grams of the protein product in 100 ml. of water with agitation in a Waring Blender Model No. 1120, for about 90 seconds. Centrifuge 50 ml. of the mixture for about 5 minutes at about 1,000 r.p.m. Remove all but about 5 ml. of the supernatant liquid, add water to make volume up to 50 ml., shake gently and centrifuge again for 5 minutes at 1,000 r.p.m. The solubility index is expressed in terms of the amount of residue, expressed in ml., remaining undissolved. That is to say, the more the residue, the less soluble and less desirable the product.

Viscosity I

A 12 percent protein solution was prepared by admixing 30 grams of protein with 220 ml. of water. The mixture was placed in an open beaker and heated in a hot water bath, with agitation, for about 30 minutes at a temperature of about 165° F. The mixture was cooled to about 75° and 40° F. and the viscosity measured with an LVT Brookfield viscometer using a No. 1 spindle at 60 r.p.m.

Viscosity II

A 12 percent protein solution was prepared by admixing 30 grams of protein with 220 ml. of water. The mixture was sealed in a metal can and retorted without agitation at 250° F. for 15 minutes. The product was cooled to about 75° F., the container opened and the mixture tested for viscosity with an LVT Brookfield viscometer using a No. 1 spindle at 60 r.p.m.

TABLE I

| Product | Solubility index, ml. | Viscosity I (cps.)[a] 40° F. | 75° F. | Viscosity II (cps.),[b] 75° F. |
|---|---|---|---|---|
| A | 10.0 | Gel | [c]730 | [c]160 |
| B | 1.0 | 87.0 | 39.5 | 13.0 |
| C | 0.1 | 22.0 | 17.00 | 12.50 |
| D | 0.1 | 31.5 | 14.50 | 11.50 |

[a] 12% solution heated for 30 minutes at 165° F.
[b] 12% solution heated for 15 minutes at 250° F.
[c] Extrapolated to No. 1 spindle at 60 r.p.m.

From the results as shown in Table I, it can be seen that the products of the invention, C and D, consistently show better physical properties than similar products that are currently available.

Example 2

The procedure as disclosed in I of Example 1 is substantially repeated. The concentrated curd was diluted to about 15 percent by weight solids and the pH adjusted to about 3.5 with an acid mixture comprising phosphoric, citric and malic acids. The acid curd was passed to a Jet Cooker where the temperature was raised instantaneously to about 310° F., held at that temperature for about 5 seconds and subsequently injected into a vacuum chamber under 27 inches of mercury vacuum. The curd was then passed from the vacuum chamber to a spray drier under a pressure of 4,000 p.s.i., said drier having an exhaust temperature of about 180° F. The resulting product was a finely divided, particulate, acid product.

The properties of the acid product were tested in accordance with the procedures set forth in Example 1. Product E represents the product made in accordance with the procedures of Example 2 and product F corresponds to product A of Table I except that the product has a pH of 3.5.

TABLE II

| Product | Solubility index, ml. | Viscosity I (cps.)[a] 40° F. | 75° F. | Viscosity II (cps.),[b] 75° F. |
|---|---|---|---|---|
| E | 0.3 | 54 | 34 | 14.5 |
| F | 10.0 | Gel | Gel | Gel |

[a] 12% solution heated for 30 minutes at 165° F.
[b] 12% solution heated for 15 minutes at 250° F.

Example 3

I. Defatted soybean flakes were slurried in water at a temperature of 85° F. with a water to flake ratio of 9:1. To the slurry was added 1.6 percent of calcium hydroxide and 1.0 percent of sodium sulfite, said percentages being based on the total weight of the flakes. The slurry was agitated for a period of 30 minutes and subsequently the liquid was separated from the solid materials in a centrifuge. The solid materials were reslurried in water at a ratio of 6 parts per water to 1 part of flakes and this slurry was agitated for a period of 10 minutes, after which time the solid and liquid materials were separated, as before, in a centrifuge. The two liquid portions or extracts were combined.

To the combined liquid portions, which contains soluble proteins and carbohydrates, was added 7.5 percent sodium hydroxide, said percentage being based on the estimated dry weight of protein present. The liquid portion has a pH of about 11.5 after the addition of sodium hydroxide. The liquid was then passed to a Jet Cooker where the temperature was raised instantaneously to a temperature of about 310° F. and held at that temperature for a period of about 90 seconds. The liquid was then passed to a vacuum chamber under 27 inches of mercury vacuum and said liquid was adjusted to a pH of about 4.5 to obtain a precipitated protein curd. The curd and liquid were separated and the curd washed thoroughly to remove the soluble carbohydrate materials present. The washed curd was diluted in a ratio of 1:1 with fresh water and concentrated to about 20 percent by weight solids.

II. NEUTRAL, SOLUBLE PROTEIN PRODUCT

The concentrated curd of I above was diluted to about 15 percent by weight solids and the pH adjusted to about 6.8 with sodium hydroxide. The neutralized protein curd was then passed to a Jet Cooker where the temperature of the curd was raised instantaneously to a temperature of 310° F. and held at that temperature for a period of about 5 seconds. The curd was then injected into a vacuum chamber under 27 inches of mercury vacuum. The heated curd was passed from the vacuum chamber to a spray drier under a pressure of 4,000 p.s.i. and dried at an exhaust temperature of 180° F. The resulting product was a finely divided, particulate, neutral, protein product having viscosity and solubility properties substantially the same as those products produced in accordance with the procedures of Example I.

Example 4

The procedure as disclosed in I of Example 3 was substantially repeated. The concentrated curd of II was diluted to about 15 percent by weight solids and the pH adjusted to about 3.5 with an acid mixture comprising phosphoric, citric and malic acids. The acid curd was passed to a Jet Cooker where the temperature was raised instantaneously to about 310° F., held at that temperature for about 5 seconds and subsequently injected into a vacuum chamber under 27 inches of mercury vacuum. The curd was then passed from the vacuum chamber to a spray drier under a pressure of 4,000 p.s.i., said drier having an exhaust temperature of about 180° F. The resulting product was a finely divided, particulate, acid product having substantially the same properties as the product produced in accordance with Example 2.

Example 5

The procedure of Example 1 is substantially repeated except that in part I, the solution containing protein only is adjusted to a pH of from about 1 to about 2 with sulfuric acid instead of to about 11.5 with sodium hydroxide. The product has substantially the same properties as that produced in accordance with the procedure of Example 1.

Example 6

The procedure of Example 5 is substantially repeated except that the curd of part II is adjusted to a pH of about 3.5 instead of about 6.8. The properties of the product produced were similar to the product produced with the procedure of Example 1, except the product was slightly more viscous.

Example 7

I. Defatted soybean flakes are slurried in water at a temperature of 85° F. with a water to flake ratio of 9:1. To the slurry is added sulfuric acid in an amount sufficient to adjust the slurry to a pH range of from about 1.2 to about 2.5. The slurry is agitated for a period of 30 minutes and subsequently the liquid is separated from the solid materials in a centrifuge. The solid materials are reslurried in water at a ratio of 6 parts per water to 1 part of flakes and this slurry is agitated for a period of 10 minutes, after which time the solid and liquid materials are separated, as before, in a centrifuge. The two liquid portions or extracts are combined. The product was similar to the product produced by the procedure of Example 1, except the product was slightly more soluble and slightly more viscous.

To the combined liquid portions, which contain soluble proteins and carbohydrates, is added sulfuric acid in an amount sufficient to adjust the liquid to a pH range of from about 1 to about 2. The liquid is then heated to 160° F. and that temperature maintained for a period of 40 minutes. After heating, sodium hydroxide is added to the liquid to adjust the pH from about 1 to about 2 to the isoelectric point of the protein, i.e., pH of about 4.5. The dissolved protein is precipitated out of solution and the precipitated curd is concentrated and washed in a centrifuge to remove the carbohydrate materials as completely as possible. The washed protein curd is diluted in a ratio of 1:1 by weight with fresh water and concentrated to about 17 percent by weight solids.

II. NEUTRAL, SOLUBLE PROTEIN PRODUCT

The concentrated curd of I above is diluted to about 15 percent by weight solids and the pH adjusted to about 6.8 with sodium hydroxide. The neutralized protein curd is then passed to a Jet Cooker where the temperature of the curd is raised instantaneously to a temperature of 310° F. and held at that temperature for a period of about 5 seconds. The curd is then injected into a vacuum chamber under 27 inches of mercury vacuum. The heated curd is passed from the vacuum chamber to a spray drier under a pressure of 4,000 p.s.i. and dried at an exhaust temperature of 180° F. The resulting product is a finely divided, particulate, neutral, protein product.

III. ACID, SOLUBLE PROTEIN PRODUCT

The concentrated curd produced in I above is diluted to about 15 percent by weight solids and the pH adjusted to about 3.5 with an acid mixture comprising phosphoric, citric and malic acids. The acid curd is passed to a Jet Cooker where the temperature is raised instantaneously to about 310° F., held at that temperature for about 5 seconds and subsequently injected into a vacuum chamber under 27 inches of mercury vacuum. The curd is then passed from the vacuum chamber to a spray drier under a pressure of 4,000 p.s.i., said drier having an exhaust temperature of about 180° F. The resulting product is a finely divided, particulate, acid product.

Example 8

The procedure of Example 7 is substantially repeated except that, in part I, the protein containing solution having a pH of from about 1 to about 2 is instantaneously heated under pressure to a temperature of about 310° F. for a period of about 90 seconds and subsequently injected into a vacuum chamber instead of being heated to the lower temperature of 160° F. for a period of 40 minutes. The product produced was similar to that produced by the procedure of Example 1, except that the product was slightly more soluble.

Example 9

The procedure of Example 7 is substantially repeated except that, in part I, the protein containing solution is adjusted to a pH of about 11.5 with sodium hydroxide instead of to a range of from about 1 to about 2.

In place of the particular seed material and process conditions employed in the examples, other seed materials and process conditions may be employed as hereinbefore described to obtain soluble protein products having substantially the same properties.

What is claimed is:

1. A method for producing a soluble protein product which comprises the steps of extracting an aqueous slurry containing defatted oleaginous seed materials to form a liquid portion of said slurry containing dissolved carbohydrate and protein materials; separating the solid from the liquid portion of the slurry; adjusting the liquid portion to a pH range from about 1 to about 2 or from about 10 to about 12 and heating said liquid portion to a temperature in the range of from about 85° to about 350° F. for a time period in the range from about 24 hours to about 5 seconds; said pH adjustment and heating producing substantial alterations in the physical properties of the protein molecules; adjusting the pH of the liquid to about the isoelectric point of the protein to precipitate said protein; separating said precipitate from the liquid portion thereof; suspending the precipitate in an aqueous liquid and adjusting the aqueous protein suspension to about a neutral or strongly acid pH; subjecting said protein suspension to instantaneously heat and pressure, passing the heated suspension to a zone of lower pressure, and subsequently converting the protein to a dry, particulate protein product.

2. The method according to claim 1 wherein the defatted oleaginous seed material is defatted soybeans.

3. The method according to claim 1 wherein the precipitated protein is adjusted to a pH in the range of from about 2.0 to about 3.5 or from about 5.0 to about 7.5.

4. The method according to claim 1 wherein the protein suspension is heated instantaneously to elevated temperatures in the range of from about 220° to about 400° F.

5. The method according to claim 1 wherein the protein, after heating, is passed to a vacuum chamber.

6. The method according to claim 1 wherein the instantaneously heated protein is dried by means of a spray drier.

7. The method according to claim 1 wherein the aqueous slurry has a pH in the range of from about 1.2 to about 2.5 or from about 6 to about 11.

8. A method for producing a soluble protein product which comprises the steps of extracting an aqueous slurry containing defatted, oleaginous seed materials to form a liquid portion of said slurry containing dissolved carbohydrate and protein materials; separating the solid from the liquid portion of the slurry; adjusting the liquid portion to a pH range from about 1 to about 2 or from about 10 to about 12 and heating said liquid portion to a temperature in the range of from about 85° to about 350° F. for a time period in the range of from about 24 hours to about 5 seconds, said pH adjustments and heating producing substantial alterations in the physical properties of the protein molecules; adjusting the liquid to a pH in the range of from about 4 to about 5 to precipitate the protein; separating said precipitate from the liquid portion thereof; suspending the precipitate in an aqueous liquid and adjusting the suspension to a pH in the range of from about 2.0 to about 3.5 or from about 5.0 to about 7.5; heating said protein, while under pressure, substantially instantaneously to elevated temperatures in the range of from about 220° to about 400° F.; passing said heated protein to a zone of lower pressure and subsequently converting the protein to a dry, particulate protein product.

9. The method according to claim 8 wherein the aqueous slurry has a pH in the range of from about 1.2 to about 2.5.

10. The method according to claim 8 wherein the aqueous slurry has a pH in the range of from about 6 to about 11.

11. The method according to claim 8 wherein the defatted oleaginous seed material is defatted soybeans.

12. The method according to claim 8 wherein the zone of lower pressure is a vacuum chamber.

13. The method according to claim 8 wherein the protein is converted to a dry, particulate product by means of a spray drier.

14. A method for producing a soluble protein product which comprises the steps of extracting an aqueous slurry containing defatted soybeans to form a liquid slurry, said slurry having a pH of from about 6 to about 11 and containing dissolved carbohydrate and protein materials; separating the solid from the liquid portion of the slurry; adjusting the liquid portion to a pH in the range of from about 10 to about 12 and heating said liquid portion to a temperature in a range of from about 85° to about 350° F. for a time period in the range of from about 24 hours to about 5 seconds, said pH adjustment and heating producing substantial alterations in the physical properties of the protein molecules; adjusting the liquid to a pH in the range of from about 4 to about 5 to precipitate the protein; separating said precipitate from the liquid portion thereof; suspending the precipitate in an aqueous liquid adjusting the suspension to about a neutral or strongly acid pH; heating said protein, while under pressure, instantaneously to elevated temperatures in the range of from about 220° to about 400° F.; passing said heated protein to a zone of lower pressure and subsequently converting the protein to a dry, particulate, protein product.

15. The method according to claim 14 wherein the protein precipitate is adjusted to a pH in the range of from about 5.0 to about 7.5.

16. The method according to claim 14 wherein the protein precipitate is adjusted to a pH in the range of from about 2.0 to about 3.5.

17. The method according to claim 14 wherein the zone of lower pressure is a vacuum chamber.

18. The method according to claim 14 wherein the protein is converted to a dry, particulate product by means of a spray drier.

19. A method for producing a soluble protein product which comprises the steps of extracting an aqueous slurry containing defatted soybeans to form a liquid slurry, said slurry having a pH in the range of from about 6 to about 11 and containing dissolved carbohydrate and protein materials; separating the solid from the liquid portion of the slurry; adjusting the liquid portion to a pH of about 11.5 and heating said liquid portion at a temperature of about 160° F. for a period of about 40 minutes, said pH adjustment and heating producing substantial alterations in the physical properties of protein molecules; adjusting the liquid to a pH of about 4.5 to precipitate the protein; separating said precipitate from the liquid portion thereof; suspending the precipitate in an aqueous liquid and adjusting the suspension to about a neutral or a strongly acid pH; heating said protein, while under pressure, instantaneously to a temperature of about 320° F. for a time period of about 90 seconds; injecting said heated protein into a vacuum chamber and passing said protein into a spray drier to obtain a dry, finely divided, protein product.

20. The method according to claim 19 wherein the precipitated protein is adjusted to a pH of about 6.8.

21. The method according to claim 19 wherein the precipitated protein is adjusted to a pH of about 3.5.

* * * * *

UNITED STATES PATENT OFFICE
CERTIFICATE OF CORRECTION

Patent No. 3,645,745         Dated February 29, 1972

Inventor(s) Pete J. Magnino & Christopher W. Frederiksen

It is certified that error appears in the above-identified patent and that said Letters Patent are hereby corrected as shown below:

Column 7, lines 68 - 71 -- "The product was similar to the product produced by the procedure of Example 1, except the product was slightly more soluble and slightly more viscous" should be deleted and inserted at Column 8, line 23, at the end of the sentence.

Signed and sealed this 20th day of June 1972.

(SEAL)
Attest:

EDWARD M. FLETCHER, JR.
Attesting Officer

ROBERT GOTTSCHALK
Commissioner of Patents